US012629710B2

(12) United States Patent
Buse et al.

(10) Patent No.: US 12,629,710 B2
(45) Date of Patent: May 19, 2026

(54) CALIBRATION ADJUSTMENT FOR AGRICULTURAL SPRAYER WITH REAL-TIME, ON-MACHINE TARGET SENSOR

(71) Applicant: Deere & Company, Moline, IL (US)

(72) Inventors: Scott M. Buse, Adel, IA (US); Tarik Loukili, Urbandale, IA (US); Michael P. Schlax, Yarmouth, ME (US); Devin L. Mangus, Waukee, IA (US)

(73) Assignee: Deere & Company, Moline, IL (US)

( * ) Notice: Subject to any disclaimer, the term of this patent is extended or adjusted under 35 U.S.C. 154(b) by 799 days.

(21) Appl. No.: 17/965,222

(22) Filed: Oct. 13, 2022

(65) Prior Publication Data

US 2024/0123461 A1 Apr. 18, 2024

(51) Int. Cl.
*B05B 12/12* (2006.01)
*A01M 7/00* (2006.01)
*G05B 19/416* (2006.01)
*G06K 7/14* (2006.01)

(52) U.S. Cl.
CPC ........... *B05B 12/12* (2013.01); *A01M 7/0089* (2013.01); *G05B 19/416* (2013.01); *G06K 7/1417* (2013.01); *G05B 2219/45013* (2013.01)

(58) Field of Classification Search
None
See application file for complete search history.

(56) References Cited

U.S. PATENT DOCUMENTS

| | | | |
|---|---|---|---|
| 2022/0087094 A1 | 3/2022 | Redden et al. | |
| 2023/0245249 A1* | 8/2023 | Khait ..................... | G06Q 50/02 |
| | | | 702/2 |

* cited by examiner

*Primary Examiner* — Sean Shechtman
(74) *Attorney, Agent, or Firm* — Christopher J. Volkmann; KELLY, HOLT & CHRISTENSON PLLC

(57) ABSTRACT

A plurality of different visual markers are deployed on a field. The markers include a target marker identifying a portion of the field that has a target of material to be applied to the field and a non-target marker identifying a portion of the field that does not have a target. An on-machine target identification system sense targets as an agricultural machine travels over the visual markers to identify targets in the field. An image processing adjustment controller correlates identified targets with the visual markers to determine an accuracy of the target identification system. An action signal is generated based upon the identified accuracy of the target identification system.

16 Claims, 8 Drawing Sheets

CALIBRATION ADJUSTMENT FOR AGRICULTURAL SPRAYER WITH REAL-TIME, ON-MACHINE TARGET SENSOR

FIELD OF THE DESCRIPTION

The present description relates to the application of material to an agricultural field. More specifically, the present description relates to improving the accuracy of an agricultural machine that applies material to a field, using run-time, on-machine, target sensing.

BACKGROUND

Agricultural sprayers and other agricultural applicators apply chemicals and nutrients to agricultural fields. The chemicals and nutrients may be dry or liquid materials, and the materials can be applied for a number of reasons. For instance, the materials that are applied to a field may be pesticides, herbicides, fungicides, growth regulators, fertilizers, among others.

Some current agricultural sprayers and applicators apply product uniformly across the field, regardless of specific, localized needs. This is sometimes referred to as "broadcast" application. Some current systems also generate a prescription, prior to beginning the application process, that indicates where to apply material, which material to apply, and an application rate. The prescription is then loaded onto the agricultural sprayer and the selected product is applied to the locations in the field, based upon the prescription.

The prescription is often generated based on data that is aggregated using manual scouting, or imagery taken by machines, such as drones, aircraft or satellites. The prescriptions may also be generated based on past field history.

The discussion above is merely provided for general background information and is not intended to be used as an aid in determining the scope of the claimed subject matter.

SUMMARY

A plurality of different visual markers are deployed on a field. The markers include a target marker identifying a portion of the field that has a target of material to be applied to the field and a non-target marker identifying a portion of the field that does not have a target. An on-machine target identification system senses targets as an agricultural machine travels over the visual markers to identify targets in the field. An image processing adjustment controller correlates identified targets with the visual markers to determine an accuracy of the target identification system. An action signal is generated based upon the identified accuracy of the target identification system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
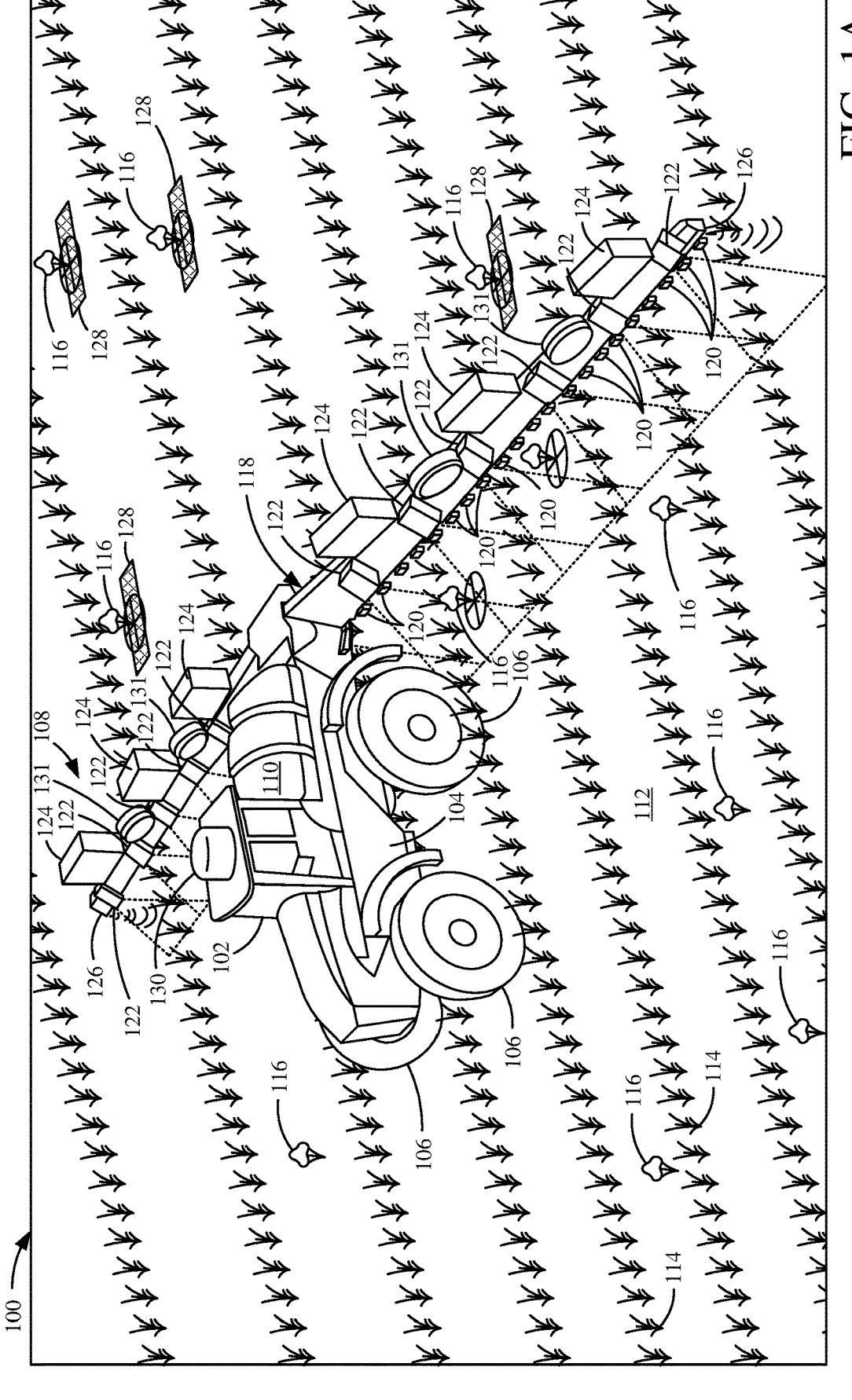
FIG. 1A is a pictorial view of an agricultural machine.

As described above, some current agricultural sprayers and agricultural applicators apply product uniformly across a field, regardless of any specific localized needs. This approach, sometimes referred to as a "broadcast" approach, results in the application of chemical and other materials where it is not required. This increases production costs and may have a potentially negative environmental impact. In some cases where herbicide is applied, for instance, up to 80% of the total product is applied where it is not needed.

Also, as briefly discussed above, some current systems attempt to generate prescription indicating where to apply material to the field. However, the prescription is created ahead of time (prior to the application process by which the agricultural machine applies the material to the field). The prescription is then loaded into the agricultural sprayer, or agricultural applicator, and used in applying the material to the field.

Although this process may reduce the amount of material being applied, it has significant limitations. For instance, because the data used to generate such prescriptions is obtained through manual scouting or through imagery, or through past field history, the data is subject to georeferencing and application errors. Therefore, the locations of the particular targets of the material application are not precisely defined. This, in turn, means that larger application zones around the targets are used in order to ensure that the desired targets are indeed covered by the material being applied.

A problem with data collection from aerial images is that the image quality is often not adequate to identify targets, such as pests or weeds. The image quality issues are normally attributed to the height at which the images were taken or the distance from the targets at which the images were taken, lighting conditions, cloud cover, obscurants, and other atmospheric conditions. Similarly, because these types of images and other data collection processes are performed hours or even days or weeks ahead of the application process, the targets in the field may have changed or additional targets may have appeared, so that the sprayer will not be operating on an accurate prescription.

The present description thus proceeds with respect to a system that provides a real-time, on-board target identification and control system that uses optical sensors, mounted on a sprayer or other agricultural applicator (hereinafter referred to as the agricultural machine). The target identification and control system captures an image of an area ahead of the agricultural machine, in the direction of travel, and processes that image to identify targets in time for applicator functionality on the agricultural machine to apply a material to those targets.

Also, a challenge with such a system is that it is very difficult to tell whether the target identification and control system is operating accurately. For instance, the system may generate a false positive so that material is applied where it should not be applied or a false negative so that no material is applied where it should be applied. By way of example, if the agricultural machine is applying herbicide, the system may generate a false positive by identifying a rock or a piece of residue as a weed and applying herbicide to the rock or piece of residue. The system may generate a false negative by failing to identify a weed as a target so that no herbicide is applied to the weed. The present system thus includes an image processing adjustment controller. Markers are deployed in a portion of a field. The markers include target markers and non-target markers that are visually distinguishable from one another. The target markers are deployed in the field to identify targets and the non-target markers are deployed in the field to identify non-targets. The agricultural machine then travels over the portion of the field with deployed markers. The image processing adjustment controller determines how accurately the target identification system is working based on what the targeting system identified in the areas marked by the markers. The control system can then make adjustments to the agricultural machine and/or the targeting system to improve accuracy.

FIG. 1A shows a pictorial illustration of one example of an agricultural machine 100. Agricultural machine 100 is depicted as an agricultural sprayer that has an operator compartment 102, supported by a frame structure 104, which also supports ground engaging elements 106. In the example shown in FIG. 1A, ground engaging elements 106 are wheels, but they could be tracks or other implementations. FIG. 1A also shows that agricultural machine 100 has a spray system generally indicated by 108. Spray system 108 illustratively includes a tank or other material reservoir 110 that carries material that is to be applied to an agricultural field 112. In the example shown in FIG. 1A, agricultural field 112 has row crops planted in rows 114 and a plurality of weeds 116 that are growing therein. While FIG. 1A shows one material reservoir 110, it will be noted that agricultural machine 100 may have more than one material reservoir 110 each carrying a different material or different concentration of material. Also, while FIG. 1A shows machine 100 in a field with rows 114 of crops, the present description can also proceed with an example in which machine 100 is treating an area without crops, such as a field after harvest and before planting, or another area without crops.

Spray system 108 also illustratively includes a boom structure 118 that supports a plurality of controllable nozzle bodies 120. Nozzle bodies 120 can include an electronic controller that receives commands over a network, such as a controller area network—CAN, or other data communication protocols. The nozzle body 120 can also include one or more controllable valves that can be moved between an open position and a closed position. The nozzle body 120 can also include one or more nozzle spray control tips. Material to be applied by agricultural machine 100 is pumped by one or more pumps from tank 110, through hoses or other conduits, to the nozzle bodies 120. The controller in the nozzle bodies 120 controls the controllable valves to open (or move to the on position) so that the material moves through the nozzle body and out through the nozzle spray control tip where the material is applied to the field 112. When the valve is controlled to be in the closed position (or the off position) the material does not pass through the valve. In one example, the valves are variable between the on and off positions, such as proportional values. In other examples, a variable flow rate can be achieved through the valves by controlling the pump or by controlling the valves in a pulse width modulated manner (varying the cycle time) or in other intermittent ways.

FIG. 1A also shows that agricultural machine 100 is fitted with a plurality of different optical image sensors 122 (shown as cameras in FIG. 1A). Image sensors 122 may be optical sensors which capture images by sensing radiation in the optical spectrum which, for purposes of the present discussion, includes ultraviolet, visible, and infrared frequencies. The image sensors 122 are disposed along the boom so that they have fields of view that cover the length of the ground in front of the boom 118. For instance, the image sensors 122 are disposed across boom 118 so that their fields of view cover all of the area of field 112 forward of nozzle bodies 120, as agricultural machine 100 travels through the field.

The image sensors 122 are illustratively coupled to one or more image processing modules 124. The image processing modules 124 illustratively process the images captured by image sensors 122 to identify targets (e.g., weeds 116 or rows 114) on field 112 over which agricultural machine 100 is traveling. Image sensors 122 can have an image processing system that performs some preprocessing. For instance, different cameras may be different so the on-camera image processing system may generate color correction matrices that adjust or calibrate the camera so all cameras produce images of the same color. The on-board image processing system can also perform other processing, such as lens shading correction, local tone mapping, demosaic, color correction, and distortion correction. The correction information can be captured in correction matrices or in other ways. Some or all of the pre-processing can be performed on the image processing modules 124 as well.

It will be noted that, in one example, the position of boom 118 (and in particular the position of each image sensor 122) relative to the surface of field 112, may change the field of view of the image sensors 122. For example, at a first height above the field, an image sensor 122 may have a field of view with a first size so the area or region of interest being analyzed for targets takes up most of the field of view. However, when the image sensor 122 is moved to a greater height (further from the ground), then the width of the region on the ground that is included in the field of view of image sensor 122 may be larger, but the area being examined for targets remains the same.

Therefore, in one example, boom 118 has one or more boom sensors 126 that sense the height (in another implementation, sensor 126 can also or alternatively sense the angle and/or boom vibrations) of boom 118 relative to the surface of field 112 over which it is traveling. The boom height (and boom angle) can be used by image processing modules 124 to correct the images received from the various image sensors 122, based upon their location relative to the ground from which the images are captured. Thus, in one example, the image processing modules 124 identify weeds 116 as targets of a herbicide being applied by agricultural machine 100 and transmits information about the location of the weeds 116 to a nozzle controller so that the nozzle controller can control the valves in the nozzle bodies 120 to apply the herbicide to the weeds 116. In one example, the nozzle bodies are controlled to apply the material in a treated area 128 that has a buffer area on either side of weed 116 to increase the likelihood that the weed 116 is treated by the herbicide.

Image processing may be affected by ambient light conditions. Therefore, FIG. 1A also shows that boom 118 may have one or more supplemental light sources 131 which can be activated in low light conditions.

Also, in order to process the images in various different types of light conditions (which may change based on whether agricultural machine 100 is heading into the sun, away from the sun, or otherwise), FIG. 1A shows that agricultural machine 100 can have a white balance camera or an incidental light sensor (light sensor 130). Light sensor 130 can sense the direction of the sun relative to agricultural machine 100, the color of the sun (such as whether the sky is overcast, whether machine 100 is traveling through a shadow, or other conditions that change the color of the light), and the light intensity among other things. Similarly, light sensors 130 may be disposed at one or more locations along boom 118 instead of, or in addition to, light sensor 130 on the body of the agricultural machine 100, as shown in FIG. 1A. The ambient lighting conditions are sensed by light sensor(s) 130 and the information representing the ambient lighting conditions is sent to image processing modules 124. The data can be sent using data over power transmission, using a gigabit multimedia serial link (GMSL or GMSL2) or using another communication mechanism.

Figure 1B:
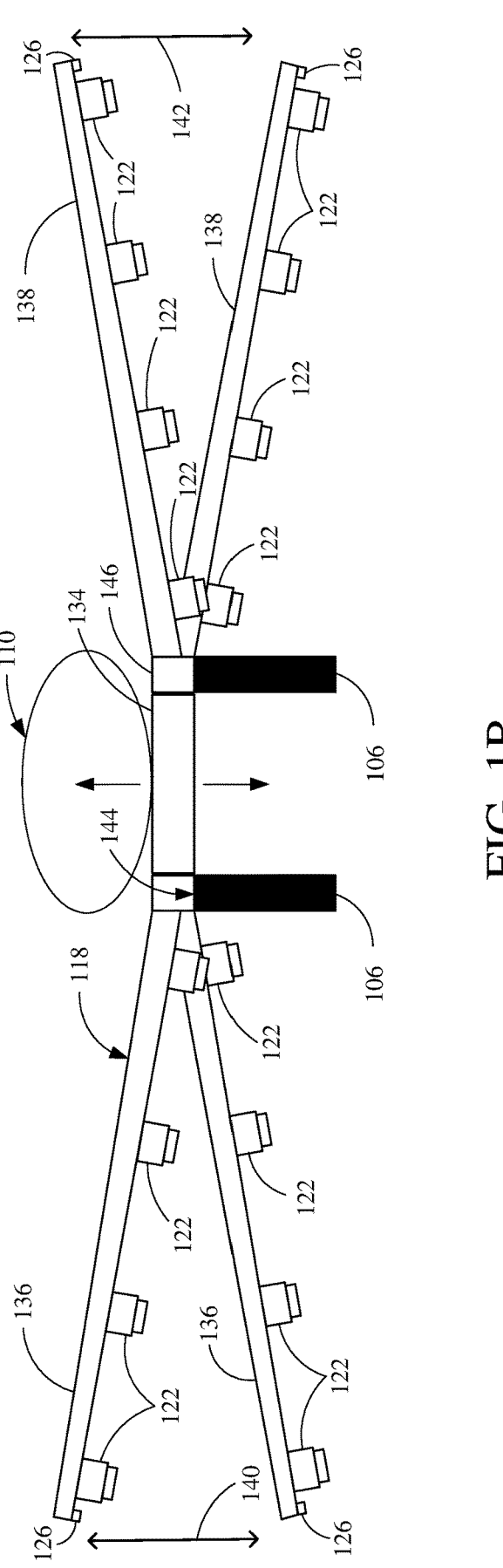
FIG. 1B is a pictorial view illustrating movement of a boom on an agricultural machine.

FIG. 1B shows a pictorial illustration of a rear view of agricultural machine 100, and items that are similar to those shown in FIG. 1A are similarly numbered. FIG. 1B shows that boom 118 can have a central boom section 134 and one or more boom arms 136 and 138 on either side of central boom section 134. In one example, central boom section 134 can be raised and lowered under force of a central boom actuator (not shown in FIG. 1B). As shown in FIG. 1B, boom arms 136 and 138 may rotate about pivot points 144 and 146, respectively. Thus, the image sensors 122 may not simply be traveling in a vertical direction when boom arms 136 and 138 are raised and lowered, but they are moving in an arc about pivot points 144 and 146. This can cause the orientation of the cameras to be focused more inwardly, toward a central axis of agricultural machine 100, or outwardly, away from agricultural machine 100. Thus, as the boom 118 moves, the perspectives of the cameras, and thus the fields of view of the image sensors 122 on the ground, will move as well. Similarly, as agricultural machine 100 travels through the field, it may encounter bumps, ruts, or other disturbances on the ground. This may cause the boom arms 136 and 138 to move upwardly or downwardly in the directions indicated by arrows 140 and 142. Therefore, in one example, the cameras or image sensors 122 are calibrated at different heights from the ground (e.g., at different boom positions). A calibration transform is generated that can be used to transform the captured images so that the area of interest (or region of interest—ROI) within the image captured by each image sensor 122 remains at a fixed location on the ground relative to the corresponding image sensor 122 (e.g., one meter in front of the image sensor in the direction of travel), regardless of the boom position.

Figure 1C:
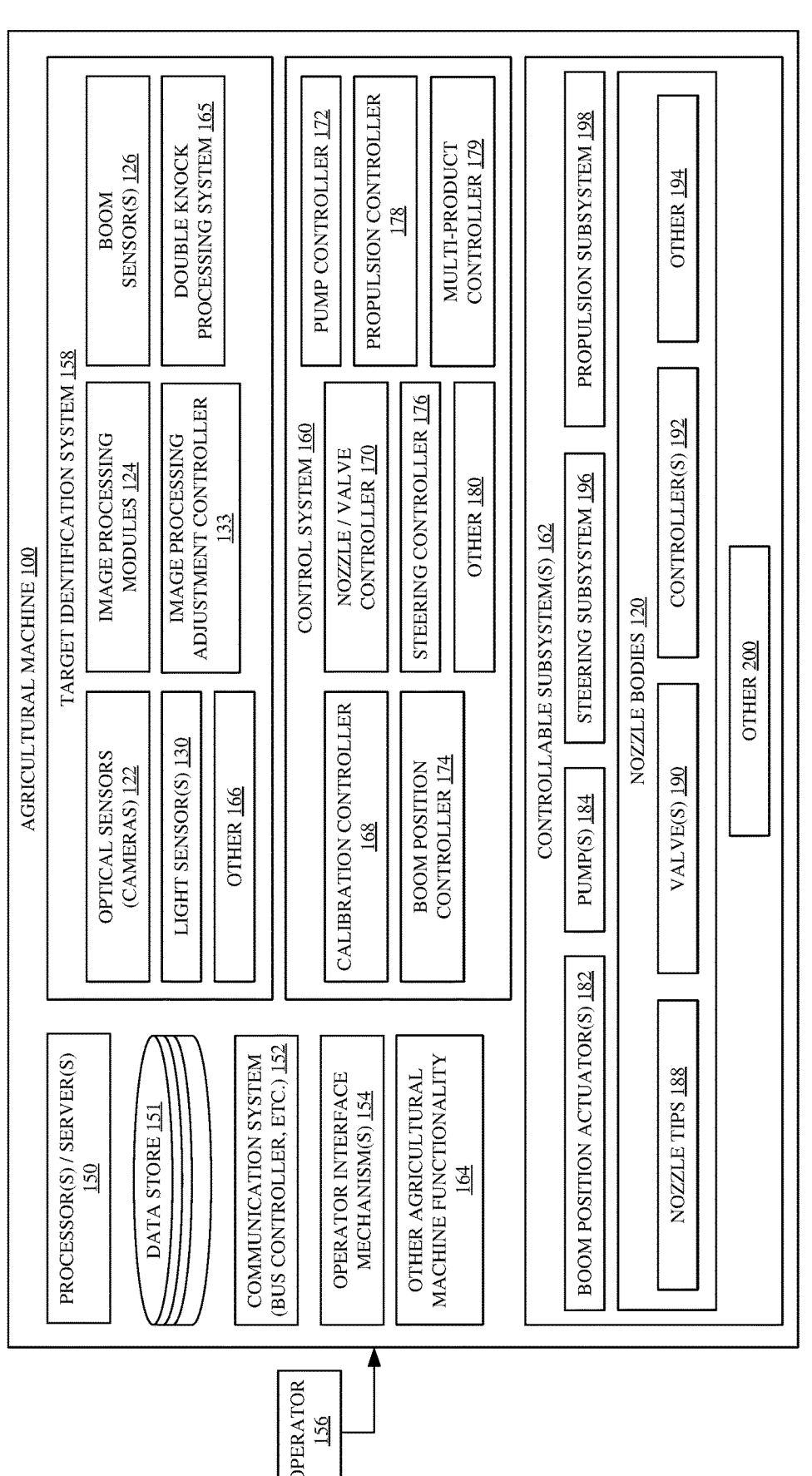
FIG. 1C is a block diagram showing one example of an agricultural system.

FIG. 1C is a block diagram showing some portions of agricultural machine 100 in more detail. Some of the items shown in FIG. 1C are similar to those shown in FIGS. 1A and 1B and they are similarly numbered. FIG. 1C shows that agricultural machine 100 can also include one or more processors or servers 150, data store 151, a communication system 152, one or more operator interface mechanisms 154 that an operator 156 can interact with in order to control and manipulate agricultural machine 100, target identification system 158, control system 160, controllable subsystems 162, and agricultural machine 100 can include a wide variety of other agricultural machine functionality 164. Target identification system 158 can include optical sensors 122, image processing modules 124, light sensors 130, image processing adjustment controller 133, boom height/angle sensors 126, double knock processing system 165, and it can include other items 166. Control system 160 can include calibration controller 168, nozzle/valve controller 170, pump controller 172, boom position controller 174, steering controller 176, propulsion controller 178, and multi-product controller 179. Control system 160 can also include other items 180. Controllable subsystems 162 can include boom position actuators 182, one or more pumps 184, nozzle bodies 120 (which, themselves, can include one or more nozzle tips 188, valves 190, valve controllers 192, and other items 194), steering subsystem 196, propulsion subsystem 198, and a wide variety of other items 200.

Before describing the overall operation of agricultural machine 100 in identifying visual markers and determining the accuracy of target identification system 158 and control system 160 in applying material to targets, a description of some of the items shown in FIG. 1C, and their operation, will first be provided. Operator interface mechanisms 154 can include any of a wide variety of mechanisms that can be used to provide information to operator 156 and receive interactive inputs from operator 156. Operator interface mechanisms 154 can include audio, visual, and haptic mechanisms, among others. Examples of operator interface mechanisms 154 can include a steering wheel, joysticks, pedals, levers, buttons, microphones and speakers (such as when speech recognition/synthesis functionality is provided), among other things. User interface mechanisms 154 can include display screens, touch sensitive display screens, lights, audible alert mechanisms, etc. When the user interface mechanisms 154 include a display screen, operator input mechanisms can be provided on the display screen. Such operator input mechanisms can include buttons, links, icons, or other user actuatable elements that can be actuated using a point and click device, a touch gesture, a voice input, or other interactions.

Communication system 152 can include a bus controller that controls information on one or more bus structures (such as a CAN bus, a plurality of different CAN subnetworks, or another bus) on agricultural machine 100. Communication system 152 can include wired networking components such as ethernet components that operate according to a known standard (e.g., IEEE 802.3), and other types of network and communication system components. Communication system 152 can also include other communication systems that allow agricultural machine 100 to communicate with remote devices or systems. Such communication systems can include a cellular communication system, a local area network communication system, a wide area network communication system, a near field communication system, or a wide variety of other communication systems.

Target identification system 158 illustratively identifies targets where material is to be applied by agricultural machine 100 and also identifies the visual markers when they are deployed in a field during calibration. For example, when agricultural machine 100 is to apply the material to crop plants, then target identification system 158 identifies crop plants (such as crop rows or other crop plants such as seeded crops). When agricultural machine 100 is to apply the material to a weed, for instance, then target identification system 158 identifies weeds so that the material can be applied to them. Therefore, each of the image sensors 122 captures images of a region of interest within the field of view corresponding to the image sensor 122. The captured image can be compensated or corrected based on information detected by light sensor 130. Image processing modules 124 then process the images captured by image sensors 122 to correct them and to identify targets (e.g., crop rows, weeds, etc.) and markers (visual target markers and non-target markers and possibly other markers, such as April tags, etc.) in the images. The images can then be transformed based on information captured by boom sensors 126 and mapping coefficients that match pixels in the image (e.g., the pixels corresponding to a target or marker) to actual locations on the ground. The image processing modules 124 identify which nozzles are to be actuated, and when they are to be actuated, to apply the material to the targets. That information can then be provided to control system 160 to control the nozzle bodies 120.

It may also happen that agricultural machine 100 makes multiple passes through a field, when the passes are separated by some duration of time. For instance, some weeds may need multiple applications of one or more herbicides, with one to two weeks between applications, in order to kill them. After the first application, the weeds may appear to be dead, but unless they are treated again, they may again begin actively growing. Similarly, the weeds may be resistant to the chemical that is applied during the first pass, so that the weed still appears vibrant during the second pass. Therefore, it may be desirable to have agricultural machine 100 apply an additional dose of herbicide to the weeds, or to apply a dose of different herbicide, even though they were previously treated.

In such cases, target identification system 158 stores the location of the targets during the first pass through the field. Then, during the second pass through the field, even though the weeds may appear to be dead so that they are not identified as weed targets by target identification system 158, double knock processing system 165 identifies that particular geographic location (where the weed was treated during the first pass) as a target for a second application of the herbicide. Similarly, double knock processing system 165 can identify that a vibrant weed still exists where it was treated during the first pass and multi-product controller 179 can generate an output to apply a different chemical or an increased dose of the original chemical to the weed on the second pass than was applied during the first pass. Double knock processing system 165 receives the stored map of weed locations that was generated during the first pass and a geographic position sensor senses a geographic position of agricultural machine 100. The geographic position sensor may thus be a global navigation satellite system (GNSS) receiver, a dead reckoning system, a cellular triangulation system, or another position sensor. Based upon the current position of agricultural machine 100, its speed, and the dimensions of the machine, double knock processing system 165 can identify which nozzles will be passing over weed locations where another application of herbicide is to be administered. Multi-product controller 179 can determine whether the same or a different material is to be administered.

Image processing adjustment controller 133 correlates the locations and types of the visual markers to the locations of the targets (e.g., weeds) to determine the accuracy of target identification system 158 in identifying targets. Controller 133 can also identify adjustments that can be made to the operation of machine 100 to improve image processing accuracy. Thus, target identification system 158 (whether targets are identified based on inputs from sensors 122 or double knock processing system 165) generates an output indicating which nozzles are to be activated, when they are to be activated and a duration of time for which they are to be activated, based upon the image analysis performed by image processing modules 124 and the processing performed by double knock target identification system 165. Target identification system 158 also outputs an indication of where visual markers have been identified and characteristics of the visual markers (e.g., whether the identified markers are target markers, non-target markers, visual fiducial markers, etc.). The outputs from target identification system 158 are provided to control system which generates control signals to control controllable subsystems 162.

Calibration controller 168 can perform calibration operations to calibrate various items on agricultural machine 100. Multi-product controller 179 determines which product is to be applied. Nozzle/valve controller 170 generates control signals to control nozzle bodies 120. The control signals are received by controller 192 which controls the on and off state of valves 190 to apply the correct material at the correct location, according to the correct timing. Controller 192 can also control nozzle tips 188 (where they are configurable) to change the area of application of the nozzle.

Pump controller 172 may generate control signals to control pumps 184 that pump the material to be applied through the conduits on boom 118 to the nozzle bodies 120. Boom position controller 174 may generate control signals to control boom position actuators 182 to move the various portions of boom 118 to different desired positions. Steering controller 176 may generate control signals to control steering subsystems 196 to control the heading of agricultural machine 100. Propulsion controller 178 may generate control signals to control propulsion system 198 (which may be an engine that drives ground engaging mechanisms 106 through a transmission, individual motors that drive the individual ground engaging mechanisms 106, or another power source that drives the propulsion of agricultural machine 100) to control the speed and forward/reverse direction of travel of agricultural machine 100.

Figure 2:
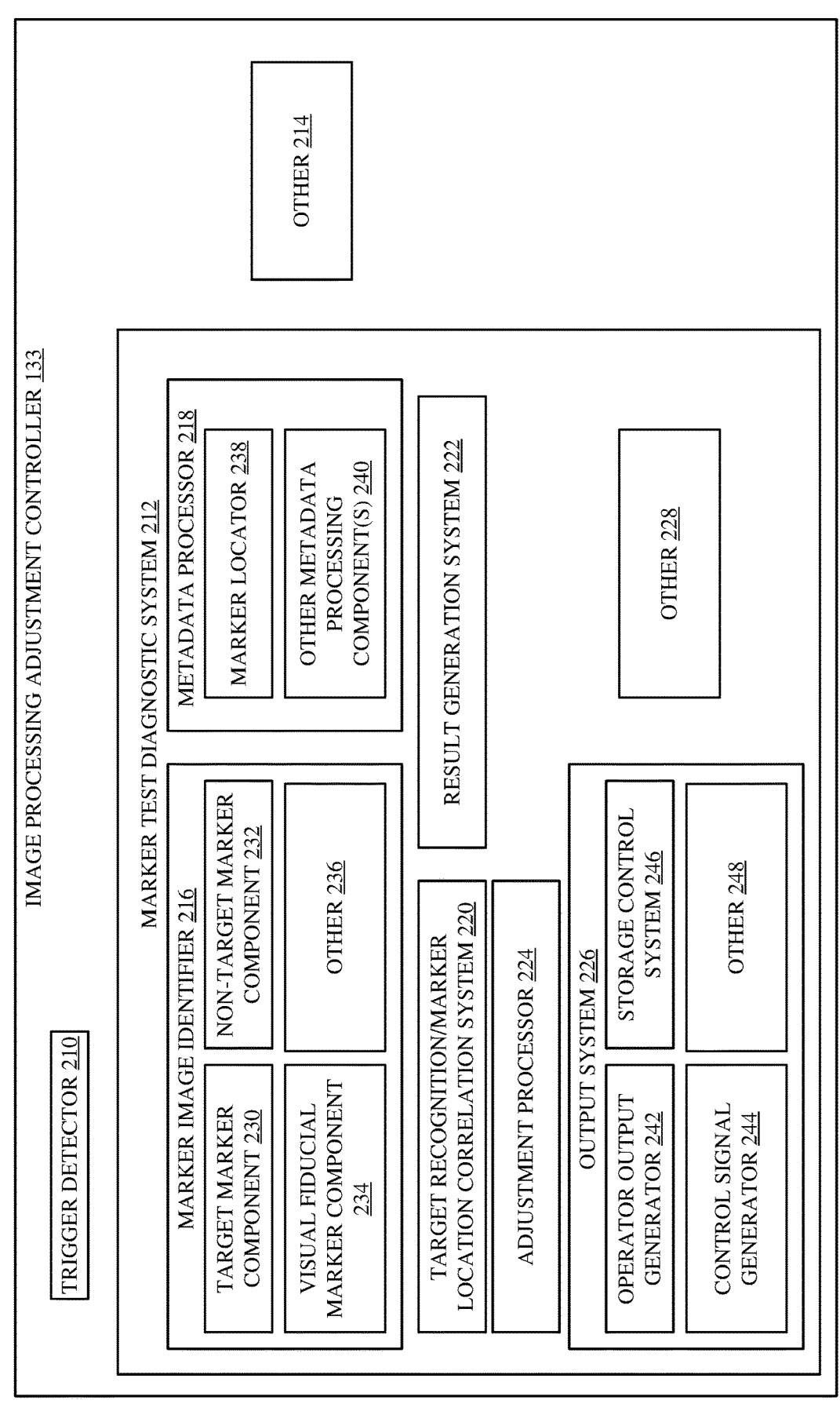
FIG. 2 is a block diagram, showing one example of an image processing adjustment controller.

FIG. 2 is a block diagram showing one example of image processing adjustment controller 133 in more detail. It will be noted that controller 133 can be located on image processing modules 124 or elsewhere. It is shown as a separate item for the sake of example only. In the example shown in FIG. 2, controller 133 includes trigger detector 210, marker test diagnostic system 212, and other items 214. Marker test diagnostic system 212 can include marker image identifier 216, metadata processor 218, target recognition/marker location correlation system 220, result generation system 222, adjustment processor 224, output system 226, and other items 228. Marker image identifier 216 can include target marker component 230, non-target marker component 232, visual fiducial marker component 234, and other items 236. Metadata processor 218 can include marker locator 238, and other metadata processing components 240. Output system 226 can also include operator output generator 242, control signal generator 244, storage control system 246, and other items 248.

Trigger detector 210 detects a trigger indicating that controller 133 is to perform an image processing adjustment or calibration. In one example, the trigger may be a manually actuated trigger, or may be an automated trigger. For instance, if the operator has deployed visual markers, and image processing modules 124 detect one of those markers, this may serve as a trigger that is detected by trigger detector 210 indicating that controller 133 is to begin to perform the adjustment or calibration operation. In another example, operator 156 may provide an input initiating an adjustment or calibration process.

Marker test diagnostic system 212 then processes information to determine the accuracy of agricultural machine 100 in identifying targets and in applying material to those targets. Marker image identifier 216 receives an input from image processing modules 124 indicating that at least one of the image processing modules 124 has detected a visual marker. Target marker component 230 identifies whether the detected marker is a target marker that is identifying a target, and non-target marker component 232 determines whether the detected marker is a non-target marker that is identifying a non-target. In one example, the visual markers have visual indicia that distinguish between whether they are a target marker and a non-target marker. In one example, the markers are rings that may be 12 inches in diameter or that may have another size, and the rings have one color that corresponds to a target marker and a different color that corresponds to a non-target marker. By way of example, a blue ring may be deployed by the operator around a weed (or another target) and a red ring may be deployed by the operator around a rock, around residue, etc., that identifies a non-target. Thus, when image processing modules 124 identify a red ring, an indication of this is output to marker image identifier 216 and identified by non-target marker component 232 as a non-target marker. When image processing modules 124 identify a blue ring, an indication of that is output to target marker component 230 which determines that the identified marker is a target marker.

Image processing modules 124 may also identify other markers, such as visual fiducial markers (e.g., April tags or other visual markers) that may include other metadata, such as a marker identifier, a location identifier, or the identity of a particular non-target or target (the type of weed, the type of non-target—rock, residue, etc.). The information extracted from the visual fiducial marker by visual fiducial marker component 234 can be output to metadata processor 218. Marker locator 238 may identify the particular geographic location of the marker based on the metadata and other metadata processing components 240 can process any other metadata to identify information (such as the type of target, the type of non-target, etc.).

Target recognition/marker location correlation system 220 receives an output from image processing modules 124 indicative of the location where image processing modules 124 identifies targets (e.g., weeds). System 220 then correlates the location of the weeds detected by image processing modules 124 in target identification system 158 with the location of the target markers and non-target markers to determine whether target identification system 158 accurately identified targets in areas marked by target markers, and whether target identification system 158 erroneously identified targets in areas marked by non-target markers. Result generation system 222 generates a result indicative of the correlation between the identified targets and the visual markers. For instance, assume that ten target markers are deployed on a portion of the field over which machine 100 is traveling, and ten non-target markers are deployed as well. Assume further that target identification system 158 correctly identified targets in locations correlated to eight of the ten target markers and identified a target in one location correlated to one of the ten non-target markers. Result generation system 222 can provide an output indicative of the accuracy in terms of ratios or percentages (e.g., target identification was accurate 85% of the time), in terms of raw data (e.g., target identification was accurate 17 of 20 times, or target identification produced two false negatives in ten tries and one false positive in ten tries, etc.), and the output can include other processing results. For instance, it may be that target identification system 158 is identifying certain types of non-targets (such as types of crops, types of residue, certain types of rocks) as targets more often than other types of non-target objects. This information can be output by result generation system 222 as well.

Adjustment processor 224 receives the results output by result generation system 222 and can identify different types of adjustments that can be made to the control of agricultural machine 100 in an attempt to improve accuracy. For instance, adjustment processor 224 may identify that changing the boom height may improve accuracy. Similarly, adjustment processor 224 may determine that slowing down the ground speed of agricultural machine 100 may improve accuracy. Adjustment processor 224 may identify a wide variety of other adjustments that may be made in order to improve the accuracy of image processing modules 124 and/or other items in target identification system 158, based upon the results generated by result generation system 222.

The various items in marker test diagnostic system 212 can provide their outputs to output system 226 which generates an output to other items in agricultural machine 100, or to remote systems or elsewhere. Operator output generator 242 can generate an output to control operator interface mechanisms 154 in order to show the results generated by result generation system 222 to operator 156. The results can be visual, audible, or other results. Control signal generator 244 can generate control signals as well. For instance, the operator output generator 242 may generate an output indicating the results of the marker test to operator 156, along with a ranked set of possible adjustments that were identified by adjustment processor 224, that may be made in order to improve accuracy. The ranked set of possible adjustments may be selectable so that operator 156 may select one or more of the set of possible adjustments for implementation. In response to such a selection, control signal generator 244 may generate a control signal to control the image processing modules 124 or the various controllable subsystems 162 to implement the adjustment. For instance, generator 244 may generate an output to automatically adjust the sensitivity of image processing modules 124. In another example, where the operator selects the proposed adjustment to reduce the ground speed of agricultural machine 100, then control signal generator 244 can generate a control signal to control propulsion subsystem 198 to reduce the speed of machine 100. In another example, control signal generator 244 can generate the control signals to automatically implement one or more of the adjustments identified by adjustment processor 224 either with or without notifying operator 156 of the adjustments. In still another example, result generation system 222 can generate intermediate results (such as when agricultural machine 100 has traveled through half of the portion of the field that has visual markers deployed) indicating the accuracy of agricultural machine 100 over the first half of the test. Adjustment processor 224 may identify possible adjustments to improve accuracy, and control signal generator can generate control signals to automatically implement those adjustments and then determine whether the accuracy of the system improves over the second half of the marker test. By automatically it is meant, for example, that the operation or function is performed without further operator input except, perhaps, to initiate or authorize the operation or function. Output system 226 can then use operator output generator 244 to generate an output to operator 156 indicating the accuracy results from the first half of test, the adjustments that were made, and the accuracy results from the second half of the test after those adjustments were made. This may help inform operator 156 as to whether the adjustments should be made during subsequent spraying operations.

Storage control system 246 can interact with data store 151 or remotely located data stores or other systems or vehicles to store the results and adjustments, and other information corresponding to the marker test, the possible adjustments, etc.

Figure 3:
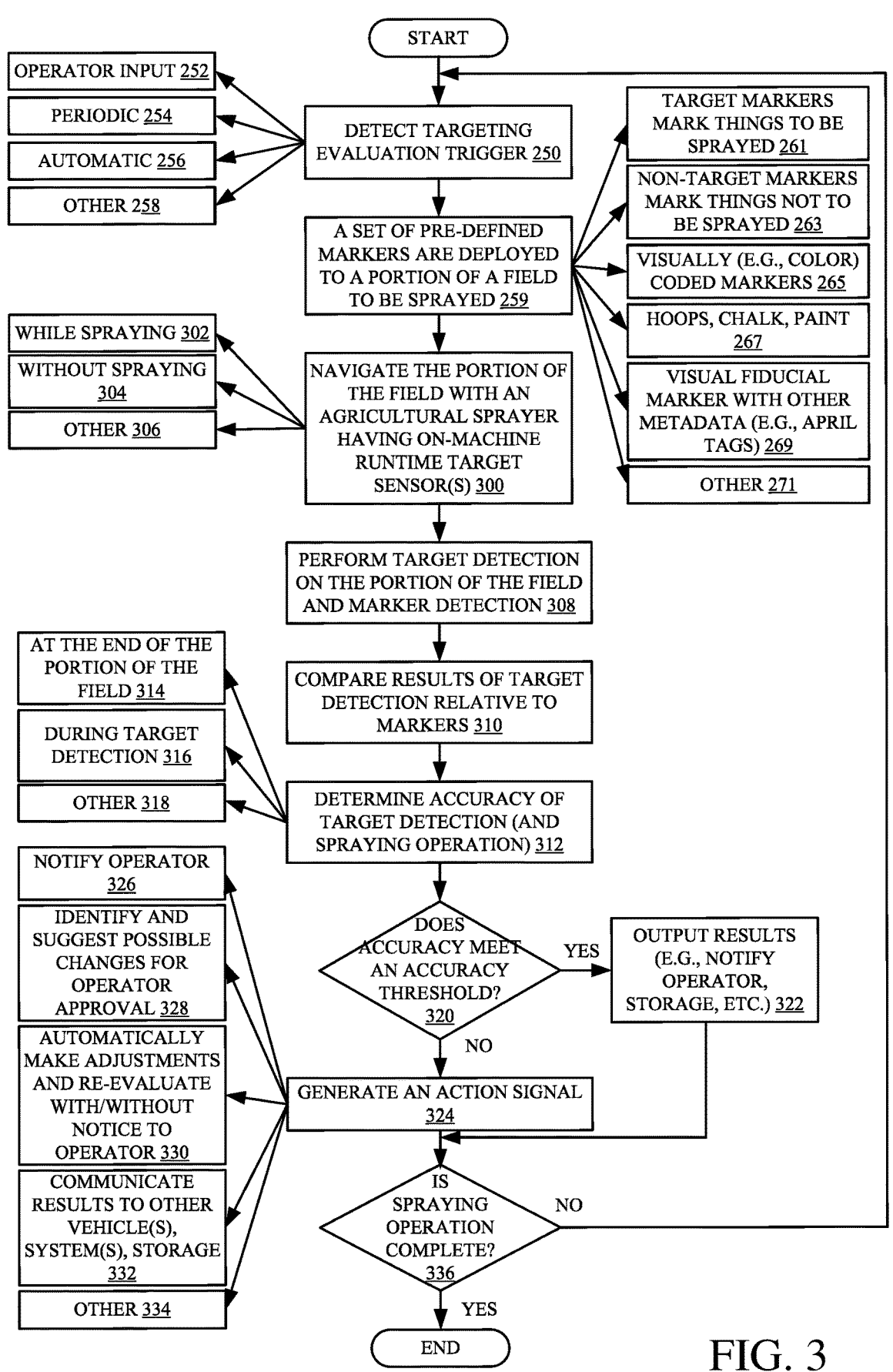
FIG. 3 is a flow diagram showing one example of the operation of the agricultural system in identifying target identification accuracy.

FIG. 3 is a flow diagram illustrating one example of the operation of agricultural machine 100 and image processing adjustment controller 133 in performing a marker test to determine the accuracy of target identification system 158. It is assumed that agricultural machine 100 is a sprayer operating in a field to be sprayed.

It is also assumed that a set of pre-defined markers are deployed to a portion of the field to be sprayed, as indicated by block 259. The pre-defined markers may be target markers that mark things to be sprayed as indicated by block 261 and non-target markers that mark things that are not to be sprayed as indicated by block 263. The markers can be visually (e.g., color or shape) coded with visual indicia so that the target markers can be visually distinguished from the non-target markers, as indicated by block 265. The markers can be hoops, chalk, paint, etc., as indicated by block 267. The markers can also include visual fiducial markers that may include other metadata (such as April tags or other markers) as indicated by block 269, or other markers as indicated by block 271.

At some point, trigger detector 210 detects a trigger indicating that the target identification system 158 is to be evaluated for accuracy, as indicated by block 250 in the flow diagram of FIG. 3. As discussed above, the trigger may be based on an operator input 252. The trigger may be periodic or an otherwise time-based trigger as indicated by block 254. The trigger may be an automatic trigger 256 or another trigger 258.

Figure 4:
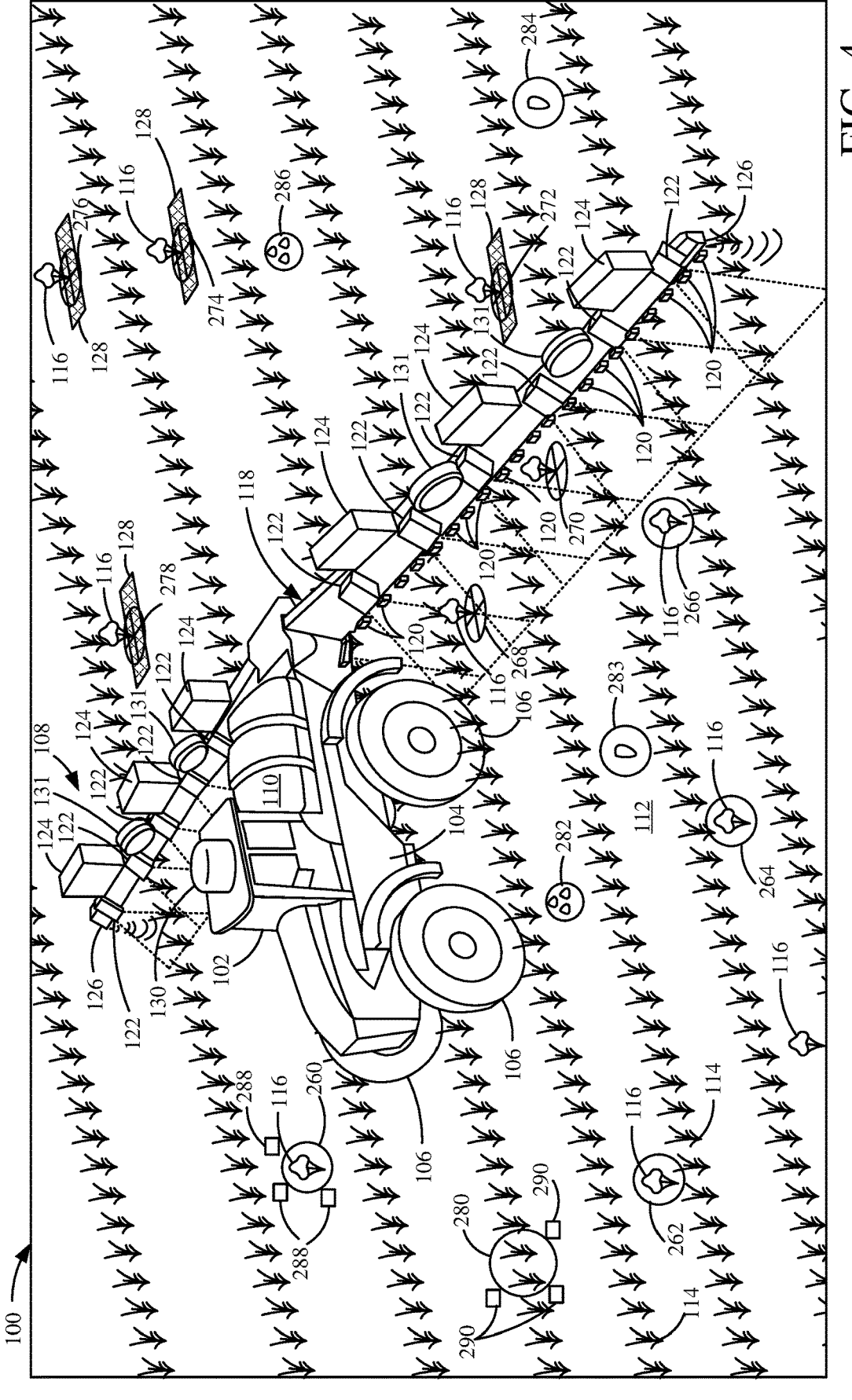
FIG. 4 is a pictorial illustration of the agricultural machine with visual markers deployed.

Assume, for instance, that the operator has deployed target markers and non-target markers on a portion of the field. FIG. 4 illustrates such a field. FIG. 4 is similar to FIG. 1A, and similar items are similarly numbered. However, FIG. 4 also shows that the operator, or another person or system has deployed a plurality of target markers in the form of colored hoops 260, 262, 264, 266, 268, 270, 272, 274, 276, 278, that are colored in a first color and a plurality of non-target markers in the form of colored hoops 280, 282, 284, and 286 that are colored with a second color that is different form the first color. Target markers 260-278 are deployed around targets (e.g., weeds) where agricultural machine 100 is to spray. Non-target markers 280-286 are deployed around non-target items. For instance, non-target marker 280 is deployed around crop plants. Non-target markers 282 and 286 are deployed around residue, while non-target markers 283 and 284 are deployed around rocks.

FIG. 4 also shows that a plurality of visual fiducial markers (such as April tags) 288 and 290 have also been deployed proximate one of the target markers 260 and one of the non-target markers 280, respectively. For purposes of the present discussion, it will be assumed that the target markers 260-278 are visually distinguished from the non-target markers 280-286 based on the color of the markers but could be distinguished based on shape or other visual indica. The target markers may, for instance, be blue, while the non-target markers may, for instance, be red, or the target markers may be round while the non-target markers may be square.

After the visual markers are deployed, agricultural machine 100 is navigated over the portion of the field where the markers have been deployed. As discussed above, the agricultural machine 100 may be an agricultural sprayer with on-machine, runtime target sensors, as indicated by block 300 in the flow diagram of FIG. 3. In one example, the marker test may be performed while agricultural machine 100 is spraying, as indicated by block 302. In another example, agricultural machine 100 may be navigated over the markers without spraying, to assess the accuracy of target identification system 158, without spraying any chemical, as indicated by block 304. The agricultural machine 100 may be navigated over the portion of the field with the visual markers deployed in other ways as well, as indicated by block 306.

While agricultural machine 100 is navigated over the visual markers, target identification system 158 performs target detection and identification, and also identifies the locations of the target and visual markers deployed in the field. Performing target detection and marker detection is indicated by block 308 in the flow diagram of FIG. 3.

The information generated by image processing modules 124 is provided to marker image identifier 216. Target marker component 230 identifies target markers based on the visual indicia (e.g., color or shape, etc.) identified by modules 124 in the image while non-target marker component 232 identifies non-target markers based on the visual indicia in the image and visual fiducial marker component 234 identifies the visual fiducial markers 288 and 290. Metadata processor 218 can use marker locator 238 to identify the location of the visual fiducial markers, and other metadata processing component 240 can identify other metadata from the visual fiducial markers.

Target recognition/marker location correlation system 220 then compares the results of the target identification performed by target identification system 158 relative to the visual markers deployed in the field, as indicated by block 310 in the flow diagram of FIG. 3. By way of example, system 220 determines whether target identification system 158 has accurately identified targets in the areas marked by the target markers 260-278. System 220 also determines whether target identification system 158 has erroneously identified any targets in the areas marked by the non-target markers 282-286. This correlation can be used to determine the accuracy of target identification system 158. For instance, a metric, indicative of how often target identification system 158 properly identified targets in the areas marked by the target markers and improperly identified targets in the areas marked by the non-target markers can be used by result generation system 222 to generate an output indicative of the accuracy of target identification system 158. Determining the accuracy of target detection is indicated by block 312 in the flow diagram of FIG. 3. In an example where agricultural machine 100 is actually spraying during the marker test, then the accuracy of the spraying operation can also be determined as corresponding to the accuracy of the target identification system 158.

As discussed above, the marker test diagnostic system 212 can generate the results at the end of the marker test (after agricultural machine 100 has traveled over the portion of the field where the visual markers are deployed) as indicated by block 314. In another example, the results of the marker test can be output in an intermediate fashion, such as after agricultural machine 100 has traveled over half of the area where the visual markers are deployed, or in another intermediate fashion, where the results are output during the target identification by target identification system 158, as indicated by block 316 in the flow diagram of FIG. 3. The accuracy of the target detection can be determined in other ways as well, as indicated by block 318.

In one example, result generation system 222 also determines whether the accuracy of the target identification system 158 is adequate (such as by comparing the accuracy to a threshold which may be manually set, automatically set, static, or dynamically changing,). Determining whether the accuracy of the target identification system 158 is sufficient (e.g., meets a threshold) is indicated by block 320 in the flow diagram of FIG. 3.

If the accuracy level does meet the threshold value, then output system 226 can output the results (e.g., notify operator 156, store the results in data store 151 or elsewhere, etc.), as indicated by block 322. However, if, at block 320, result generation system 222 determines that the accuracy does not meet the accuracy threshold value, then result generation system 222 can generate an action signal to take further action, as indicated by block 324. For instance, the action signal can be used to control operator interface mechanisms 154 to notify operator 156 that the accuracy of the target identification system 158 does not meet the threshold value, as indicated by block 326. The action signal may also be provided to adjustment processor 224 which may be a neural network or other classifier, a rules-based processor, or other logic or functionality that identifies and outputs possible changes or adjustments to the operation of agricultural machine 100 in order to improve accuracy. The possible changes may be output to operator 156 for operator selection or approval, as indicated by block 328. In another example, the action signal may be generated by control signal generator 244 to automatically make adjustments to the operation of agricultural machine 100 and then to reevaluate target identification accuracy with or without notice to the operator 156 that the adjustments are being made and that the accuracy is being reevaluated, as indicated by block 330. In another example, control signal generator 244 can generate the action signal to control communication system 152 to communicate with other vehicles, remote systems, remote storage mechanisms, etc., as indicated by block 332. The action signal can be used to perform other operations as well, as indicated by block 334.

Until the spraying operation is complete, as indicated by 336, processing reverts to block 350 where the operation continues until another targeting evaluation trigger is detected.

It can thus be seen that the present description describes a system in which the accuracy of a target identification system on an agricultural sprayer or other agricultural machine with runtime, on-machine target identification, is evaluated. Action signals are generated based upon the evaluation. The evaluation is performed by comparing whether targets are accurately identified within areas marked by visual target markers and in areas marked by visual non-target markers. The action signal can be used to notify the operator, to adjust machine operation, or to perform other operations.

Figure 5:
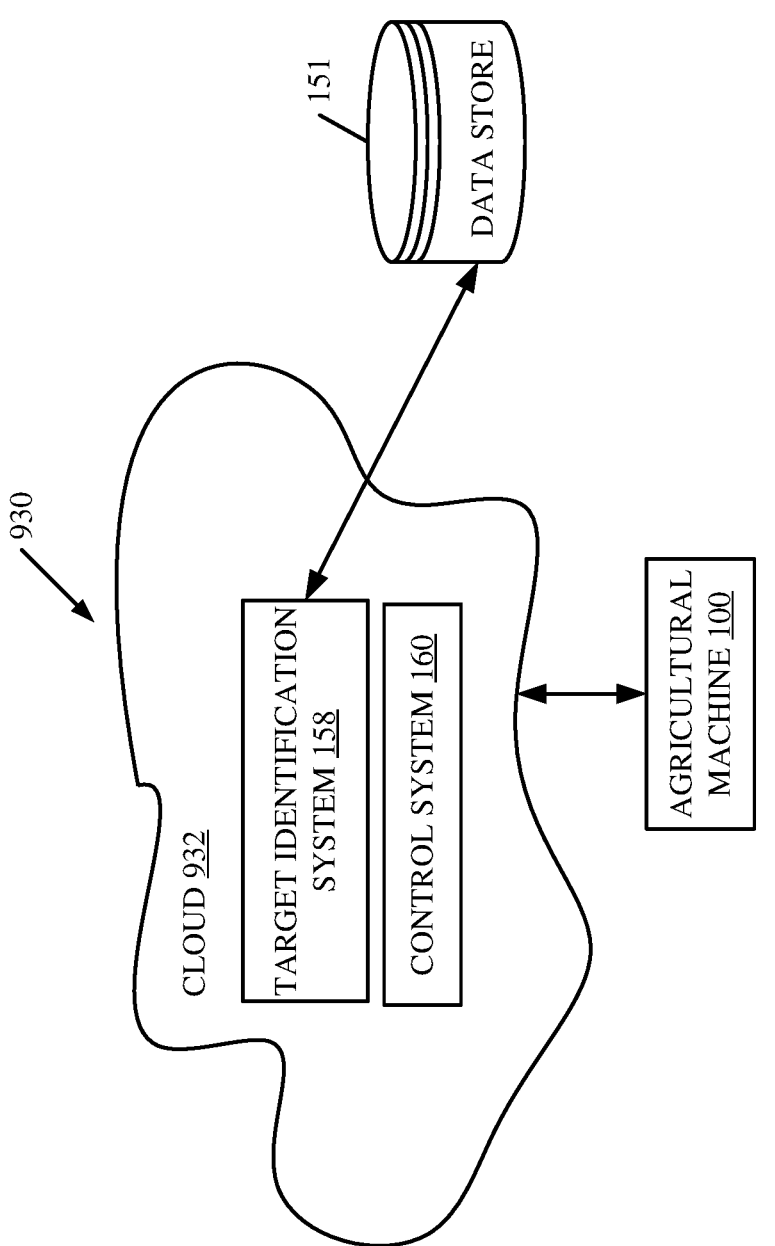
FIG. 5 is a block diagram showing one example of the agricultural machine illustrated in FIG. 1, deployed in a remote server environment.

FIG. 5 is a block diagram of machine 100, shown in FIG. 1, except that it communicates with elements in a remote server architecture 930. In one example, remote server architecture 930 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in previous FIGS. and they are similarly numbered. FIG. 5 specifically shows that target identification system 158, control system 160, and data store 151 can be located at a remote server location 932. Therefore, machine 100 accesses those systems through remote server location 932.

It is also contemplated that some elements of previous FIGS. can be disposed at remote server location 932 while others are not. By way of example, data store 151 can be disposed at a location separate from location 932, and accessed through the remote server at location 932. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 100 comes close to the fuel truck for fueling, the system automatically collects the information from the machine 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 100 until the machine 100 enters a covered location. The machine 100, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
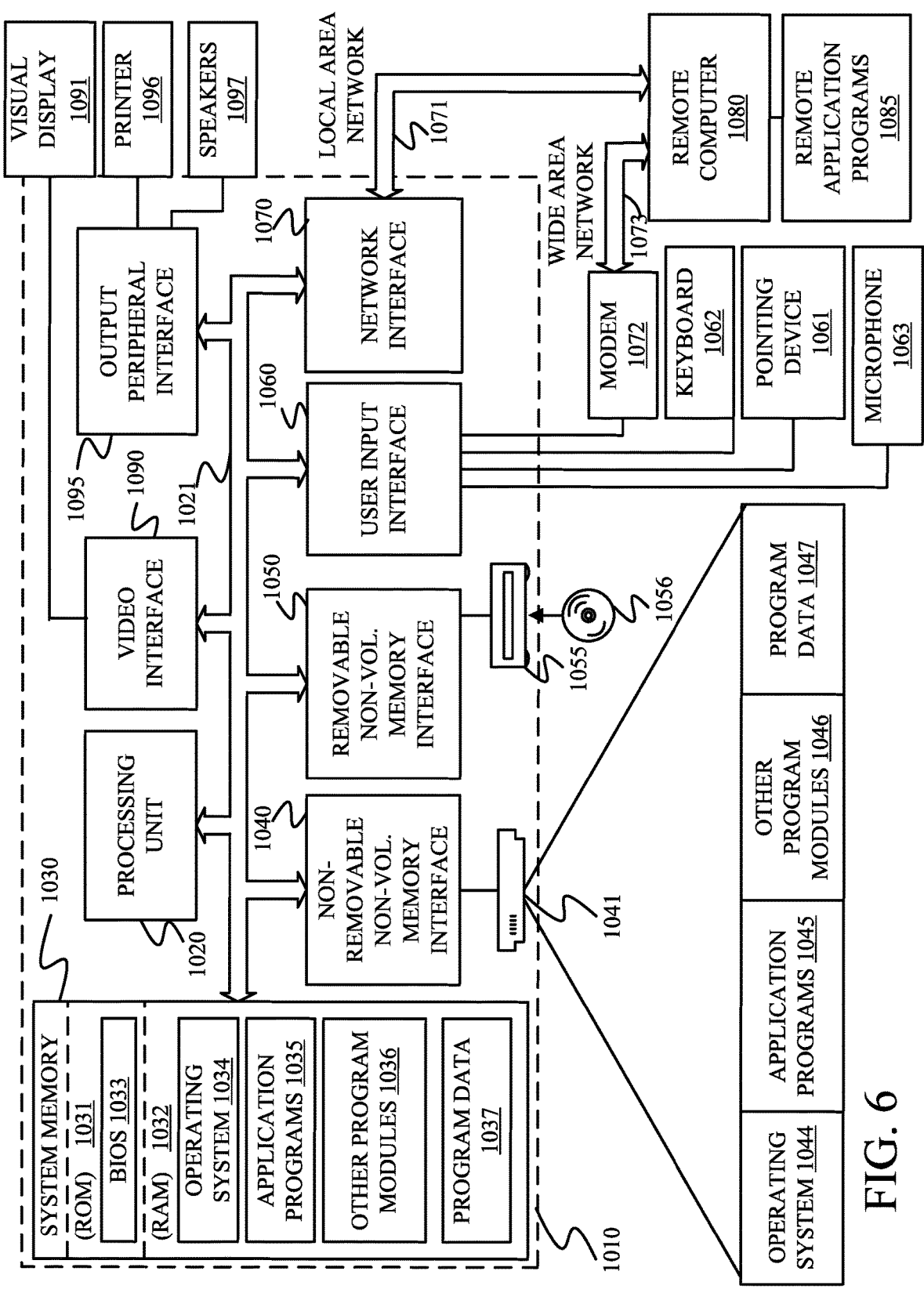
FIG. 6 is a block diagram showing one example of a computing environment that can be used on the agricultural machine and in architectures illustrated in previous figures.

FIG. 6 is one example of a computing environment in which elements of previous FIGS., or parts of them, (for example) can be deployed. With reference to FIG. 6, an example system for implementing some embodiments includes a computing device in the form of a computer 1010 programmed to operate as described above. Components of computer 1010 may include, but are not limited to, a processing unit 1020 (which can comprise processors from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Memory and programs described with respect to previous FIGS. can be deployed in corresponding portions of FIG. 6.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 832. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 6 illustrates operating system 1034, application programs 1035, other program modules 1036, and program data 1037.

The computer 1010 may also include other removable/non-removable volatile/nonvolatile computer storage media. By way of example only, FIG. 6 illustrates a hard disk drive 1041 that reads from or writes to non-removable, nonvolatile magnetic media, an optical disk drive 1055, and nonvolatile optical disk 1056. The hard disk drive 1041 is typically connected to the system bus 1021 through a non-removable memory interface such as interface 1040, and optical disk drive 1055 are typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 1010. In FIG. 6, for example, hard disk drive 1041 is illustrated as storing operating system 1044, application programs 1045, other program modules 1046, and program data 1047. Note that these components can either be the same as or different from operating system 1044, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a controller area network—CAN, local area network—LAN, or wide area network WAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 6 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling an agricultural sprayer, comprising:

detecting an image of a portion of a field ahead of a spray nozzle in a direction of travel of the agricultural sprayer;

detecting a visual marker in the image, the visual marker having a marker type and marking a marked area in the field;

performing target identification on the image to generate a target identification result indicative of whether the marked area includes a target of the agricultural sprayer, wherein the visual marker comprises an artificial marker positioned at a location corresponding to the marked area in the field;

determining a target identification accuracy based on the target identification result and the marker type; and controlling the agricultural sprayer based on the target identification accuracy, wherein controlling the agricultural sprayer based on the target identification accuracy comprises:

identifying a machine adjustment based on the target identification accuracy; and controlling the agricultural sprayer to perform a spraying operation based on the machine adjustment.

2. The computer implemented method of claim 1 wherein detecting the visual marker comprises:

detecting a visual indicium corresponding to the visual marker; and detecting the marker type as a target marker or a non-target marker based on the visual indicium, wherein the target marker is deployed when the marked area contains the target of the agricultural sprayer and the non-target marker is deployed when the marked area does not contain the target of the agricultural sprayer.

3. The computer implemented method of claim 2 wherein detecting the visual indicium comprises:

detecting one of a shape of the visual marker or a color of the visual marker.

4. The computer implemented method of claim 2 wherein performing target identification comprises:

generating the target identification result and a corresponding location, indicative of whether the image includes a target of the agricultural sprayer; and identifying a location of the marked area defined by the visual marker.

5. The computer implemented method of claim 4 wherein performing target identification comprises:

correlating the target identification result and corresponding location to the location of the marked area to generate a target/marker correlation.

6. The computer implemented method of claim 5 wherein determining the target identification accuracy comprises:

determining the target identification accuracy based on the target/marker correlation.

7. The computer implemented method of claim 2 wherein the agricultural sprayer travels over a portion of the field that has a plurality of target markers deployed and a plurality of non-target markers deployed, and wherein performing target identification comprises:

determining whether, for each respective target marker of the plurality of target markers, a target is detected in the marked area defined by the respective target marker, to obtain a target value; and determining whether, for each respective non-target marker of the plurality of non-target markers, a target is identified in the marked area defined by the respective non-target marker, to obtain a non-target value.

8. The computer implemented method of claim 7 wherein determining a target identification accuracy comprises:

generating the target identification accuracy based on the target value and the non-target value.

9. The computer implemented method of claim 1 wherein controlling the agricultural sprayer based on the target identification accuracy comprises:

controlling a user interface mechanism to output the target identification accuracy.

10. The computer implemented method of claim 1 wherein detecting a visual marker comprises:

detecting a visual fiducial marker.

11. An agricultural system, comprising:

an agricultural sprayer;

a spray nozzle mounted to the agricultural sprayer;

an optical sensor sensing an image of a portion of a field ahead of the spray nozzle in a direction of travel of the agricultural sprayer;

a target identification system detecting a visual marker in the image, the visual marker having a marker type and marking a marked area in the field, the target identification system generating a target identification result indicative of whether the marked area includes a target of the agricultural sprayer, wherein the visual marker comprises an artificial marker positioned at a location corresponding to the marked area in the field;

a result generation system determining a target identification accuracy based on the target identification result and the marker type;

an adjustment processor identifying a machine adjustment based on the target identification accuracy; and an output system controlling the agricultural sprayer to perform a spraying operation based on the machine adjustment.

12. The agricultural system of claim 11 wherein the target identification system detects a visual indicium corresponding to the visual marker, and further comprising:

a marker image identifier configured to detect the marker type as a target marker or a non-target marker based on the visual indicium, wherein the target marker is deployed when the marked area contains the target of the agricultural sprayer and the non-target marker is deployed when the marked area does not contain the target of the agricultural sprayer.

13. The agricultural system of claim 12 wherein the marker image identifier is configured to generate the target identification result and a corresponding location, indicative of whether the image includes a target of the agricultural sprayer and identify a location of the marked area defined by the visual marker, and further comprising:

a correlation system configured to correlate the target identification result and corresponding location to the location of the marked area to generate a target/marker correlation, the output system determining the target identification accuracy based on the target/marker correlation.

14. The agricultural system of claim 13 wherein the agricultural sprayer travels over a portion of the field that has a plurality of target markers deployed and a plurality of non-target markers deployed and wherein the correlation system is configured to determine whether, for each respective target marker, a target is detected in the marked area defined by the respective target marker, to obtain a target value, and determine whether, for each respective non-target marker, a target is identified in the marked area defined by the respective non-target marker, to obtain a non-target value, and wherein the output system is configured to generate the target identification accuracy based on the target value and the non-target value.

15. An agricultural system, comprising:

at least one processor; and a data store storing computer executable instructions which, when executed by the at least one processor, cause the at least one processor to perform steps, comprising:

receiving an image signal indicative of an image of a portion of a field ahead of a spray nozzle in a direction of travel of an agricultural sprayer;

detecting an artificial visual marker in the image, the artificial visual marker having a marker type and marking a marked area in the field;

performing target identification on the image to generate a target identification result indicative of whether the marked area includes a target of the agricultural sprayer;

determining a target identification accuracy based on the target identification result and the marker type;

identifying a machine adjustment based on the target identification accuracy; and controlling the agricultural sprayer to perform a spraying operation based on the machine adjustment.

16. The agricultural system of claim 15 wherein detecting the artificial visual marker comprises:

detecting a visual indicium corresponding to the artificial visual marker; and detecting the marker type as a target marker or a non-target marker based on the visual indicium, wherein the target marker is deployed when the marked area contains the target of the agricultural sprayer and the non-target marker is deployed when the marked area does not contain the target of the agricultural sprayer.

* * * * *